Feb. 17, 1970 H. GREINER ET AL 3,495,888

ROLLER BEARING CAGE

Filed July 13, 1967

INVENTORS
HELMUT GREINER,
HEINRICH KORRENN,
LUDWIG LINNER,
FRANZ MULLER
BY *Stevens, Davis, Miller & Mosher*
ATTORNEYS

United States Patent Office 3,495,888
Patented Feb. 17, 1970

3,495,888
ROLLER BEARING CAGE
Helmut Greiner and Heinrich Korrenn, Schweinfurt, Ludwig Linner, Munich, and Franz Muller, Schweinfurt, Germany, assignors to Kugelfischer Georg Schafer & Co., Schweinfurt, Germany
Filed July 13, 1967, Ser. No. 653,189
Claims priority, application Germany, July 27, 1966, K 59,895
Int. Cl. F16c 33/38, 33/46
U.S. Cl. 308—212         4 Claims

ABSTRACT OF THE DISCLOSURE

A cage of the so-called window-type of formed sheet metal for receiving therein a plurality of rollers in an equal plurality of window-like openings or pockets in the cage. Each pocket having a periphery of similar profile to said roller in the axial plane of the rollers, which is perpendicular to the contact angle and passes through the roller axis. The outer surfaces of said pockets, lying outwardly of the said axial plane of said roller, having a profile following the profile of said rollers in the circumferential direction while the side surface lying on the other side, inwardly of the said axial plane, being perpendicular to the said axial plane.

---

The present invention relates to a window-type cage of pressed sheet metal formed to receive a series of rollers in either single-row or double-row configuration and particularly to self-aligning, radial roller bearings. The cage consists of a ring with a plurality of window-like openings or pockets therein which surround the roller bearings and are adapted to follow the longitudinal periphery of the rollers.

The anti-friction bearings of today customarily consist of an inner race, an outer race, a plurality of rolling members arranged between the races and a cage for holding the rolling members. The purpose of the cage is primarily to guide the rolling members of the bearing, i.e., to assure uniform spacing between the rolling members in the circumferential direction of the bearing. In a few types of bearings, such as needle bearings, and certain types of self-aligning roller bearings, the object of the cage to provide guidance also extends to providing for the continuous alignment of the rolling members in such manner that their axes at all times lie essentially in a plane which also includes the axis of the bearing. Stated differently, the cages of such bearings serve to prevent the skewing of the rolling members. In the case of bearings which can be disassembled, e.g., tapered or cylindrical roller bearings, or swingable bearings such as self-aligning roller bearings, another important task of the cage is to prevent the rolling members from falling out in the disassembled or outwardly swung position of the bearings. In all types of bearings, it is necessary to guide and hold the cage in the bearing so that no disturbance of operation will be caused. This is accomplished by the rolling bodies and/or one or both of the races of the anti-friction bearing.

The manner in which a cage is developed to satisfy the above-mentioned objectives, namely, guidance and holding of the rolling bodies and guidance and holding of the cage itself, depends both on the type of bearing (the structural shape of the bearing) and on the possible special requirements made on the bearing, such as high speeds of rotation or vibration-free operation, and furthermore on the construction of the cage. In principle, cages may be distinguished between sheet-metal cages, on the one hand, and solid cages on the other hand. Both sheet-metal and solid cages are developed in accordance with different factors and in each case have specific advantages over the other type of cage construction so that each type of cage construction has its own field of use corresponding to its special properties. The advantages of the sheet-metal cages reside in their lower weight, smaller space requirements, and their lower price. In contradistinction, the solid cages have greater rigidity, strength, and accuracy.

Sheet-metal cages are used today in all types of ball and roller bearings. The window-type cage formed as a single unit has in particular found wide use in the case of radial roller bearings. A wide variety of window-type cages are known, but they all have in common the feature essential to window-type cages, namely, that an annular section containing the individual pocket intended to receive the roller normally has a radially inward or outward protruding flange on one or both sides adjacent the roller. In the case of tapered roller bearings, this annular section is conical, in cylindrical bearings it is cylindrical, and in barrel-shaped roller bearings it is cylindro-conical or barrel shaped. The pockets are all adapted, in the axial plane of the rollers, to follow the contour of the axial section of the rollers.

The pockets of the window-type, pressed sheet metal cages are pressed or punched out of the annular section of the cage in the radial direction or in the case of bearings having the axes of the rollers inclined with respect to the axis of the bearing in the direction of the pressure angle line. Thus, pockets are formed with side and end surfaces having generatrices which are straight lines perpendicular to the cage axis or parallel to the pressure angle line so that there is naturally no provision for holding of the rollers in the radial direction or in the direction of the pressure angle line. Instead, special means are required for this holding purpose which, in many cases, in addition to holding the rollers, also takes over the guiding of the cage in the radial direction. This is done, for instance, by bending out lugs of the Z cages of radial-cylindrical roller bearings. In the case of the customary lugless window-type cage for tapered roller bearings, the pockets of the loose premounted cage are narrowed with plastic deformation after insertion of the rollers. In both cases, the rollers are held axially by annular borders. The cage is also held axially fast by the rollers.

Lugless embodiments of window-type sheet-metal cages of the type described above are also well known for use with self-aligning, radial roller bearings. In this case, the radial support of the rollers is obtained by, for instance, forming, approximately in the center of the cage bars, a plurality of local plastic indentations which reduce the cross-sectional area of the pocket of above the bearing pitch circle thereby preventing the rollers from dropping out. Since this method of supporting the rollers has not proved satisfactory, due to the detrimental influence on the precision of the guidance of the rollers, a further possibility of manufacture of projections necessary for holding the radial rollers has been developed and is characterized by the fact that the pockets are provided in two successive punching processes. In these known methods, by means of two separate initial punching steps, the holding surfaces for radially holding the rollers, which surfaces lie approximately in the center of the cage bars of the finished cage, are formed whereupon in two second separate punching steps the lateral guide surfaces for the rollers are formed.

With the increasing demands on bearings, particularly for higher speeds of rotation, anti-friction bearings of higher precision must be used. This higher precision is obtained by the greater accuracy of dimension, shape and running properties of the rings and rolling bodies and also by an accurately manufactured cage with smooth slide surfaces. In the case of the known embodiments described above and without exception, pressed and punched window-type sheet-metal cages for self-aligning, radial roller bearings have set limits for the precision which are controlling. The axial and radial cage pockets stagger and the quality of the surface of the window-type cage surfaces produced by punching varies so that these cages can no longer sufficiently satisfy modern increased demands. Another disadvantage of these known embodiments of the cage resides in the fact that the surfaces on the cage serving for guiding and holding the rollers are produced in separate operations thus introducing the danger of displacement of these surfaces with respect to each other. Finally, the guiding surfaces of known cage pockets formed in the direction of the punching cut from linear generatrices result in a poor surrounding of the rollers, in their circumferential direction, whereby the formation of a lubricating wedge between the roller and cage is made difficult.

It is therefore an object of the present invention to avoid the above-mentioned disadvantages and to provide a window-type sheet-metal cage for roller bearings, particularly for self-aligning, radial roller bearings, which assures dependable support of the rollers, has excellent guiding properties and thus provides assurance of excellent running properties of the roller bearing equipped therewith. It is also an object of the subject invention to provide a window-type cage which may be readily and economically produced.

These objects are obtained, in accordance with the invention, in the case of window-type cages of the aforementioned type in that the sections of the side surfaces of the cage pockets which lie on one side of the said axial plane of the rollers are adapted to the profile of the rollers in circumferential direction. The sections of the side surfaces of the pockets lying on the other side of the said axial plane are surfaces with linear generatrices which are perpendicular to the said axial plane.

The means for accomplishing the foregoing objects and other advantages, which will be apparent to those skilled in the art, are set forth in the following specification and claims and are illustrated in the accompanying drawings dealing with a basic embodiment of the present invention in which:

Figure 1:
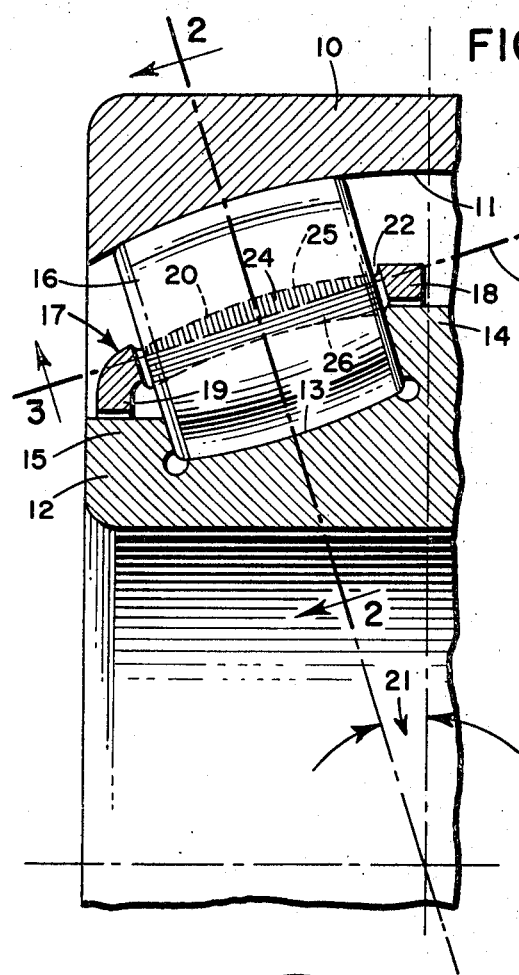
FIG. 1 is a partial sectional view taken along an axial line through a two-row, self-aligning, radial roller bearing having a window-type cage in accordance with the present invention, only the left-hand roller being shown.

The portion of a two-row, self-aligning noller bearing shown in FIG. 1 consists of an outer race 10 with a spherically developed track 11, an inner race 12 with two corresponding toric tracks 13, only the left track of which is shown, as well as a middle ring collar 14 and two outer ring collars 15 of which also only the left-hand outer ring collar can be seen. Between the outer race 10 and the inner race 12 there are arranged two rows of barrel rollers 16, only one roller of the left-hand row being shown. For each row of rollers there is provided a separate window-type cage 17 of pressed sheet metal, the cage 17 which guides and holds the rollers is composed of a cylindrical section 18 guided on the middle ring collar 14 of the inner race 12, and a radially extending flange 19 guided on the outer ring collar 15 of the inner race 12, and an intermediate ring-shaped section 20 which is of curved axial section or can be of conical-cylindrical shape. The barrel rollers 16 are inclined from the longitudinal axis of the bearing by the pressure angle 21.

Figure 3:
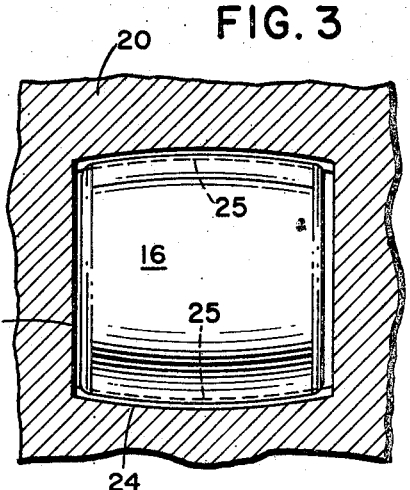
FIG. 3 shows a partial sectional view in an enlarged scale taken along line 2—2 of FIG. 1.
Figure 2:
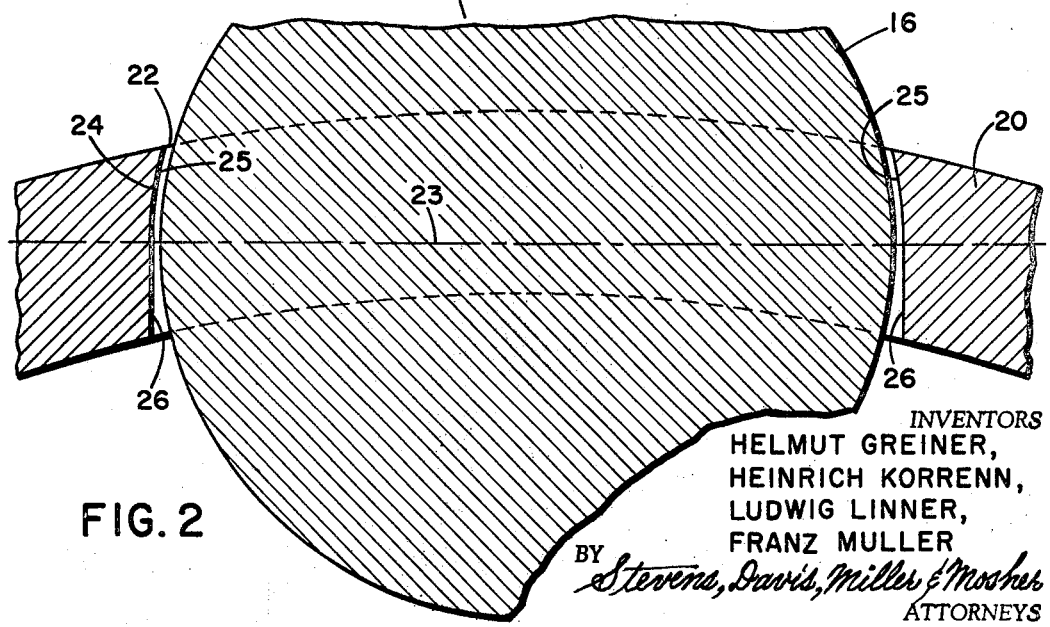
FIG. 2 is a partial sectional view taken along line 3—3 of FIG. 1.

As can be noted from FIG. 1, when considered together with FIG. 3, there are provided in the section 20 of the cage 17 a number of pockets 22. The axial plane 23 of the rollers 16 is shown in FIGS. 1 to 3. The pockets are adapted to the barrel profile of the rollers above this axial line. In this connection, the side surfaces 24 of the pockets 22 are so developed that the portions 25 lying above the axial plane 23 are adapted in the circumferential direction to the profile of the barrel rollers 16 while the portions 26 of the side surfaces 24 located below the axial plane 23 are surfaces with linear generatrices perpendicular to the axial plane 23. In FIG. 1, with respect to line 3—3 the outer portion 25 is noted with vertical hatching and the hatching of the inner portion 26 is parallel there to in order to illustrate this feature with greater clarity. This also can be noted particularly from FIG. 3 which shows the section of the cage in an enlarged scale. As will be noted from FIGS. 1 through 3, the cage 17 is provided with a plurality of pockets 22 in the section 20 of the cage. The side surfaces 24 of the pockets 22 are developed so that the portion 25 of the surface lying above the axial plane 23 is adapted, in the circumferential direction, to the profile of the barrel roller 16 while the portion 26 of the side surfaces 24 located below the axial plane 23 is formed with linear generatrices which are perpendicular to the axial plane 23.

Figure 4:
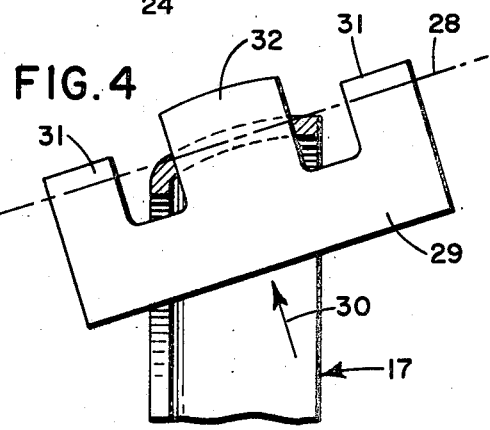
FIG. 4 is an axial section view through the inventive window-type cage in which the pocket has just been completed by the manufacturing tool still shown in place.

The pockets 22 are produced in a particularly advantageous manner as will be discussed with reference to FIG. 4. A swivel miller cutter 29, swinging about the axis 28, is moved in the direction indicated by the arrow 30 against the firmly clamped cage 17. The swivel miller cutter 29 has its own arms 31 supported in a tool holder, not shown. The cutting head 32 of the miller cutter 29 has its outer surface shaped corresponding to the shape of the barrel rollers 16.

The invention has been explained above using as an example a window-type cage for two-row, self-aligning, radial roller bearings. Window-type cages in accordance with the invention can, however, also be used in connection with other roller bearings, for instance, tapered roller bearing, axial self-aligning roller bearings and the like.

In the roller bearing cage of the invention, the rollers (of any suitable shape such as cylindrical, tapered, or barrel rollers) are guided substantially over their entire length by the side surfaces 24 and at the same time are prevented from falling out by the portions 25 of the surfaces 24. The surface portions 25 and 26 of the side surfaces 24 are produced in one operation so that a displacement of the means effecting the guiding and holding of the rollers is excluded. Another advantage of the inventive cage is the better enveloping of the rollers in their circumferential direction resulting from the curved generatrices of the surface portions 25 of the side surfaces 24 since, in this way, the formation of the lubricating wedge is favored and friction as well as wear between the cage and roller are reduced. Finally, by the machining of the cage pocket surfaces, precise, smooth surfaces may be obtained.

The invention may be embodied in other specific forms without departing from the spirit or essential characteristics thereof.

What is claimed is:

1. A pressed sheet-metal cake, especially for self-aligning, radial roller bearings, comprising a sheet metal ring, at least one row of apertures in said ring, said apertures having the profile of the bearings to be inserted therein along the plane thereof, those portions of the side surfaces of said apertures lying on one side of a plane through the center of said aperture being curved in the circumferential direction and adapted to the profile of the bearings while those portions of the side surfaces lying on the other side of said plane being surfaces with straight generatrices which are perpendicular to the axial plane.

2. An anti-friction bearing having an inner race, outer race, a plurality of rolling bodies arranged between said races and a cage retaining said rolling bodies, said cage comprising a sheet-metal ring, a plurality of apertures in said ring, each said aperture having a peripheral profile adapted to the profile of the rollers taken along an axial plane through said rollers, the side surfaces of said apertures, in section, comprising first and second portions, the first portion defined by the outer surface and the axial plane of the rollers, the second portion defined by the inner surface of said ring and the axial plane of the rollers, said first portion having a profile adapted in the circumferential direction to the profile of said rollers, said second portion being formed perpendicular to said axial plane.

3. A method of forming a pressed sheet-metal cage for receiving at least one row of roller bearings therein comprising the steps of forming a cage of sheet-metal, forming a plurality of window-like openings in said cage, each said window-like opening being formed with a planar profile similar to that of the bearing to be inserted therein, the side surfaces of said openings being formed in two portions along a plane passing substantially through the center of said opening, one of said portions being arcuate and corresponding to the profile of the bearings in the circumferential direction and the other portion being straight generatices perpendicular to said central plane.

4. A method of forming a pressed sheet-metal cage for receiving at least one row of roller bearings therein comprising the steps of forming a cage of sheet-metal; cutting a plurality of window-like openings in said cage by swinging a swivel miller cutter, having a cutting head corresponding to the shape of the roller bearings to be inserted in the openings, about an axis perpendicular to the direction of pressure exerted by the roller bearing to be inserted in the openings and lying in a plane containing the longitudinal axis of the cage and moving said cutter in said direction of pressure outwardly against said cage; said openings being formed in two portions along a plane passing substantially through the center of said opening, the one of said portions lying adjacent the outer surface of said cage being arcuate and corresponding to the profile of the bearings in the circumferential direction and the other portion being straight generatrices perpendicular to said central plane.

References Cited

UNITED STATES PATENTS

| | | | |
|---|---|---|---|
| 3,310,351 | 3/1967 | Ortegren | 308—217 |
| 1,765,648 | 6/1930 | Boh | 308—217 |
| 725,763 | 4/1903 | Noyes | 308—217 |

FOREIGN PATENTS

| | | |
|---|---|---|
| 659,974 | 10/1951 | Great Britain. |
| 661,256 | 11/1951 | Great Britain. |

MARTIN P. SCHWADRON, Primary Examiner

FRANK SUSKO, Assistant Examiner

U.S. Cl. X.R.

29—149.4